United States Patent

Yoshida et al.

[11] Patent Number: 6,105,395
[45] Date of Patent: Aug. 22, 2000

[54] MANUFACTURING METHOD FOR GLASS MOLDED PRODUCTS

[75] Inventors: Masahiro Yoshida, Saitama; Teruo Yamashita; Lihong Zhang, both of Tokyo; Yoshiatsu Yokoo, Saitama, all of Japan

[73] Assignee: Hoya Corporation, Tokyo, Japan

[21] Appl. No.: 08/998,063

[22] Filed: Dec. 24, 1997

[30] Foreign Application Priority Data

Dec. 26, 1996 [JP] Japan .................................. 8-348535

[51] Int. Cl.$^7$ ...................................................... C03B 11/08
[52] U.S. Cl. ................................. 65/102; 65/106; 65/111; 65/66; 65/226; 65/404; 65/408; 264/1.25; 264/2.5; 264/219
[58] Field of Search .............................. 65/102, 106, 111, 65/207, 226, 66, 404, 406, 407, 408; 264/1.25, 2.5, 219; 425/394, 403

[56] References Cited

U.S. PATENT DOCUMENTS

| | | | |
|---|---|---|---|
| 3,579,316 | 5/1971 | Dyott et al. . | |
| 4,964,903 | 10/1990 | Carpenter et al. | 65/275 |
| 5,199,966 | 4/1993 | Harvey et al. | 65/407 |
| 5,425,118 | 6/1995 | Sugihara et al. . | |
| 5,435,818 | 7/1995 | Mashige et al. | 65/102 |

FOREIGN PATENT DOCUMENTS

| | | |
|---|---|---|
| 0 580 112 | 1/1994 | European Pat. Off. . |
| 0 608 566 | 3/1994 | European Pat. Off. . |
| 608566 | 8/1994 | European Pat. Off. . |
| 0 736 497 | 9/1996 | European Pat. Off. . |
| 34 47 632 | 11/1985 | Germany . |
| 2-026844 | 1/1990 | Japan . |
| 06201936 | 7/1994 | Japan . |
| 6-201936 | 7/1994 | Japan . |
| 07005341 | 1/1995 | Japan . |
| 7-5341 | 1/1995 | Japan . |
| 7-218739 | 8/1995 | Japan . |
| 8-211244 | 8/1996 | Japan . |

*Primary Examiner*—Stanley S. Silverman
*Assistant Examiner*—Michael P. Colaianni
*Attorney, Agent, or Firm*—Burns, Doane, Swecker & Mathis, LLP

[57] ABSTRACT

In a method for molding glass products having a fine structure as of an optical fiber holder with a high size precision, a mold used for the molding has the fine structure in a size such that a size difference occurring when the glass product is cooled down to a room temperature where at the end of molding with a pressure a size of the fine structure of the mold for glass product and a size of a fine structure of the glass product formed by transfer of the fine structure of the mold are the same as one another is so adjusted that a size of the fine structure of the completed glass product falls within a permissive size precision range. The mold may has a size satisfying, as a size of a fine structure at a room temperature, a formula $[1+(\alpha g-\alpha m)\times\Delta T+\alpha g'\times\Delta T']\times Sg$, wherein Sg denotes a size of a fine structure of the glass product at the room temperature; $\alpha g$ denotes a mean thermal expansion coefficient of the glass to be molded in a temperature range from the room temperature to the glass transition temperature of the glass to be molded; $\alpha m$ denotes a mean thermal expansion coefficient of the mold in a temperature range from the room temperature to the glass transition temperature of the glass to be molded; $\Delta T$ denotes a difference between the room temperature and the glass transition temperature of the glass to be molded; $\Delta T'$ denotes a difference between a temperature at which the mold's pressure exerted to the glass product is released and the glass transition temperature, in a case where the mold's pressure exerted to the glass product is released at a temperature higher than the glass transition temperature after pressing the mold with a high pressure; and $\alpha g'$ is a thermal expansion coefficient of the glass to be molded at a mean temperature of summation of the glass sag temperature and the glass transition temperature.

8 Claims, 7 Drawing Sheets

MANUFACTURING METHOD FOR GLASS MOLDED PRODUCTS

BACKGROUND OF THE INVENTION

1. Field of the Invention

This invention relates to a manufacturing method for precision glass molded products having a fine structure such as an optical fiber fixing member with a high size accuracy by correcting errors in size occurring due to thermal shrinkage differences between the glass molded products and the mold caused during a cooling process after pressurized molding.

2. Description of Related Art

An optical fiber used for optical communication is generally a glass made fine fiber. For example, a quartz single mode optical fiber used for long distance optical communication is constituted of a core having an outer diameter of about 10 micron meters and a clad covering the core and having an outer diameter of 125 micron meters. A quartz multi-mode optical fiber is constituted of a core having an outer diameter of 50 to 100 micron meters and a clad covering the core and having an outer diameter of 125 micron meters. Accordingly, high alignment precision is required to reduce a connection loss at optical connecting points when optical fibers are optically connected to each other or when an optical fiber is optically connected to an optical device such as an optical waveguide, a lens, an light emitting device, a photo-receiving device, etc. In particular, optical connections between quartz single mode optical fibers and between a quartz single mode optical fiber and a quartz glass single mode optical waveguide require a high alignment precision of around ±1 micron meter.

To optically connect an optical fiber with another optical fiber or optical device, the optical fiber is fixed in advance by an optical fiber fixing member such as optical connector or optical fiber array. The optical fiber array here means a member at least including an optical fiber guide block and a fiber fixing lid. The optical fiber guide block is made of a thin plate formed with engagement portions for fixing optical fibers to position the optical fibers. The fiber fixing lid is made of a thin plate for pressing the optical fibers engaging with the engagement member to fix the optical fibers. For example, Japanese Unexamined Patent Publication, Heisei No. 7-5,341 discloses an optical fiber array for fixing a tape fiber in which plural optical fibers arranged in a row are protected by a resin cover.

FIG. 1 shows an optical fiber array disclosed in FIG. 2 in above Japanese Unexamined Patent Publication, Heisei No. 7-5,341. This optical fiber array 200 includes an optical fiber guide block 204 in a thin plate shape on which a prescribed number of V-shaped grooves 203 serving as engagement portions for fixing optical fibers are formed for fixing optical fibers 202 striped from a tape fiber 201, and a fiber fixing lid 205 for optical fibers in a thin plate shape to press the optical fibers to immobilize the fibers engaged with the V-shaped grooves 203. The optical fiber guide block 204 constituting the optical fiber array 200 has, in addition to the V-shaped grooves 203, a seat 207 for securing a covered portion 206 of the tape fiber 201. The seat 207 is formed at a position lower than the V-shaped grooves 203. The optical fiber array 200 includes a holding block 208 having a prescribed cross section to securely hold the covered portion 206 fixed at the seat 207.

Glass, ceramic, silicon, resin, etc. are used as a material constituting a member for fixing optical fibers (hereinafter referred to as "optical fiber holder") such as optical fiber array or the like. Ultraviolet ray setting type adhesives having good property for work are desirable for fixing the fiber fixing lid on the optical fiber guide block and for connecting the optical fiber array with other optical fiber array or the like. Therefore, glasses having good ultraviolet permeability are getting favored as a material for optical fiber arrays. An optical fiber guide block required to have a high precision in size at optical fiber engagement portions, among glass made optical fiber holders, has been fabricated by mechanically processing a glass block and the like in use of a dicing saw, diamond hone, etc. Such a fabrication process, however, raises a problem about mass production, production costs, and yields.

A method applying a method for molding optical glass lens has been proposed as a mass production method for optical fiber holder with lower costs. For example, Japanese Unexamined Patent Publication, Heisei No. 6-201,936 discloses a method for pressing a transparent material such a glass plate or the like with a high temperature by a mold having projections for forming grooves. However, no detail of the method is disclosed.

Japanese Unexamined Patent Publication Heisei No. 8-211,244 discloses a molding method for optical fiber holder using a glass containing no lead and having a low softening point. This publication, however, lacks a detailed description about means for improving precision in size of optical fiber engagement portions and has no description about precision in size of the optical fiber engagement portions of the obtained optical fiber holder.

On the other hand, Japanese Unexamined Patent Publication Heisei No. 7-218,739 discloses that a pitch precision of molded optical fiber engagement portions is highly precise, less than ±0.5 micron meter. The optical fiber engagement portions of the optical fiber holder are formed, as shown in FIG. 3, to have a distance of fiber's center to center ($l_1$ to $l_7$) of, e.g., 250 micron meters; a permissive range of vertical and horizontal deviations of fiber's center is ±0.5 micron meter; each fiber must be positioned within this permissive range. As the number of the optical fiber engagement portions increases, the permissive range of pitch precision at the projection becomes smaller, so that a higher precision in size is required. The Publication above, however, includes no description except that the pitch precision at projections is 0.5 micron meter or less to form the obtained optical fiber engagement portion.

It is not so rare for molded glass in fact to have, when glass is molded with high temperature, difference in size between the mold and the molded product of 3 micron meters or above according to molding conditions such as a combination of glasses and molds, pressures, etc. Accordingly, within the range disclosed by Japanese Unexamined Patent Publication Heisei No. 7-218,739, it would be impossible in a practical sense to mold with a high temperature a glass product having permissible range of ±0.5 micron meter with respect to pitch shifts or depth shifts.

SUMMARY OF THE INVENTION

It is an object of the invention to provide a method for molding glass products having a fine structure as of an optical fiber holder with a high size precision.

It is another object of the invention to provide a method for molding, with a high temperature and a high size precision, glass products having a fine structure required of size precision in the order of sub-micron or below as of an optical fiber holder.

In one form of the invention, a method for manufacturing a glass product includes the step of: preparing a mold having a fine structure in a size such that a size difference occurring when the glass product is cooled down to a room temperature where at the end of molding with a high pressure a size of the fine structure of the mold for glass product and a size of a fine structure of the glass product formed by transfer of the fine structure of the mold are the same as one another is so adjusted that a size of the fine structure of the completed glass product falls within a permissive size precision range;

heating glass at a sag temperature or above; and pressing the heated glass using the mold to form the glass product having the fine structure.

In another form of the invention, the mold used for pressing the glass product is for forming at least a fine structure. In order that the fine structure size of the glass product falls within a permissive size precision, the mold has to satisfy the following conditions: when a mean thermal expansion coefficient αm of the mold is larger than a mean thermal expansion coefficient αg of the glass to be molded, a size Sm of a fine structure of the mold is smaller than a size Sg of a fine structure of the glass product; when a mean thermal expansion coefficient αm of the mold is smaller than a mean thermal expansion coefficient αg of the glass to be molded, a size Sm of a fine structure of the mold is larger than a size Sg of a fine structure of the glass product; or when a mean thermal expansion coefficient αm of the mold is substantially the same as a mean thermal expansion coefficient αg of the glass to be molded, a size Sm of a fine structure of the mold is substantially the same as a size Sg of a fine structure of the glass product, wherein the mean thermal expansion coefficient αm of the mold and the mean thermal expansion coefficient αg of the glass to be molded are respective values in a temperature range from a room temperature to a glass transition temperature of a glass to be molded, and wherein sizes Sm, Sg are measured at the room temperature. The mean thermal expansion coefficients αg and αm can be values in a temperature range from the room temperature to Tg', which is a temperature 5 to 15 degrees Celsius lower than the glass transition temperature Tg of the glass to be molded, sought from a thermal expansion measurement.

In another form of the invention, a method for manufacturing a glass product having a fine structure by pressing a heated glass using a mold, includes a step of preparing the mold having a size satisfying, as a size of a fine structure at a room temperature, a formula:

$$[1+(\alpha g-\alpha m)\times\Delta T+\alpha g'\times\Delta T']\times Sg$$

wherein Sg denotes a size of a fine structure of the glass product at the room temperature; αg denotes a mean thermal expansion coefficient of the glass to be molded in a temperature range from the room temperature to the glass transition temperature of the glass to be molded; αm denotes a mean thermal expansion coefficient of the mold in a temperature range from the room temperature to the glass transition temperature of the glass to be molded; ΔT denotes a difference between the room temperature and the glass transition temperature of the glass to be molded; ΔT' denotes a difference between a temperature at which the mold's pressure exerted to the glass product is released and the glass transition temperature, in a case where the mold's pressure exerted to the glass product is released at a temperature higher than the glass transition temperature after pressing the mold with a high pressure; and αg' is a thermal expansion coefficient of the glass to be molded at a mean temperature of summation of the glass sag temperature and the glass transition temperature.

According to a preferred embodiment, after the glass is molded with pressure the pressure exerted to the glass product by the mold is released at a temperature of the glass transition temperature or less. The values of αg, αm, ΔT, αg', and ΔT' may be calculated by replacing the glass transition temperature with a temperature Tg' which is 5 to 15 degrees Celsius lower than the glass transition temperature of the glass to be molded sought from a thermal expansion measurement, and thereby the size of the fine structure of the glass product may be calculated from the obtained values. In another form of the invention, αg' and ΔT' are deemed as null, respectively.

In a preferred embodiment, the glass product is an optical fiber holder whose fine structure includes a single pitch or accumulated pitch for optical fiber engagement portions for securely holding multiple optical fibers on the optical fiber holder.

BRIEF DESCRIPTION OF THE DRAWINGS

The above and other objects and features of the invention are apparent to those skilled in the art from the following preferred embodiments thereof when considered in conjunction with the accompanied drawings, in which.

DETAILED DESCRIPTION OF PREFERRED EMBODIMENTS

Figure 1:
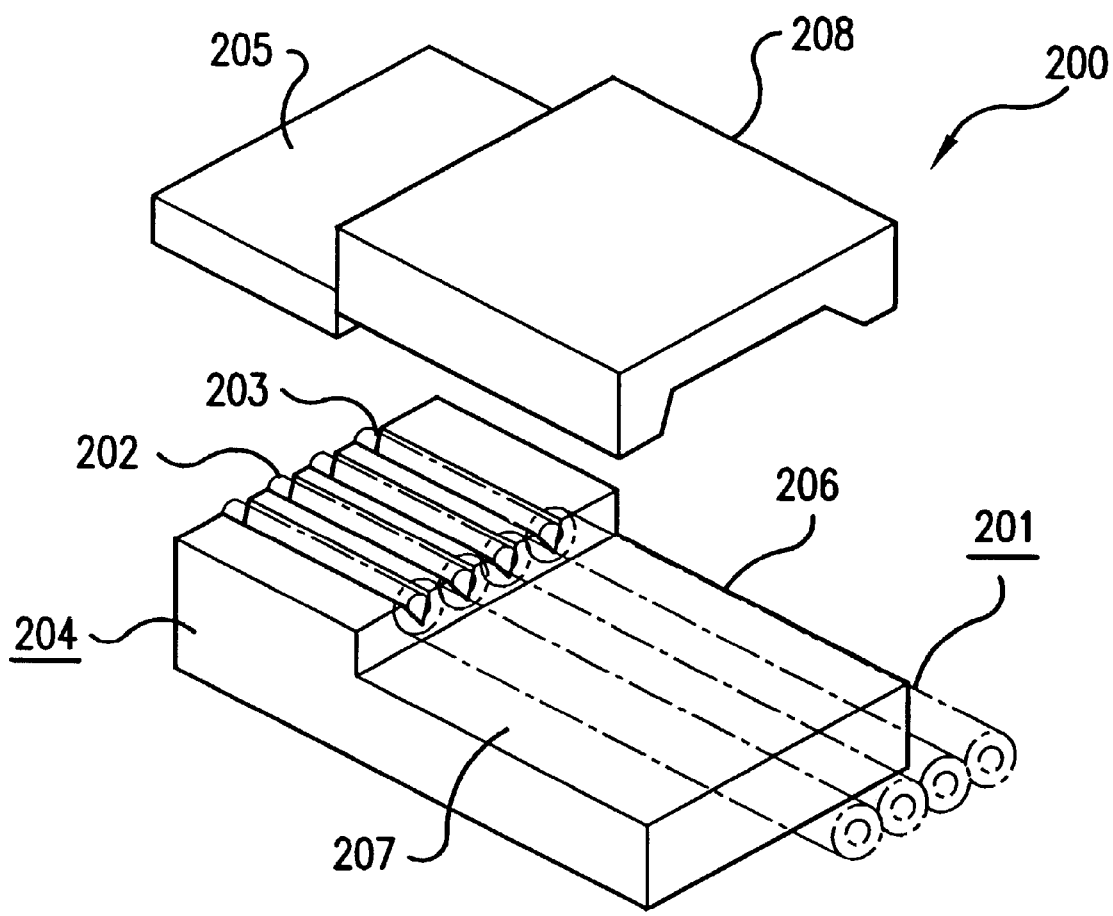
FIG. 1 is an illustration showing a typical optical fiber array.

A method according to the invention, is a method for manufacturing a glass product having a fine structure fabricated by molding with pressure a glass heated at a sag temperature or above in use of a mold. There is no specific limitation to kinds and shapes of the glass as an item to be molded. There is no specific limitation to temperature and pressure for molding, as far as it is under a condition that the glass can be transformed into a wanted shape. The fine structure in the glass product having the fine structure indicates a structure required to have precision in size to some extent regardless size and form of the structure. As the glass product having such a fine structure, exemplified are, e.g., in addition to optical fiber holders or connectors, gratings, complex or hybrid lenses in which a grating is formed on a lens face, members for fixing optical parts, substrates for mounting optical parts, reflection type optical devices, micro-machine parts, etc., but not limited to those.

The glass is molded at a high temperature of 300 to 800 degrees Celsius as a temperature of the glass' sag temperature or above. To obtain a product having a submicron precision, it is required to think influences of thermal expansions of the glass product material and the mold. This is because the mold is expanded more than that at the room temperature during molding and the glass that having molded at a high temperature shrinks during a process cooling the glass down to the room temperature.

A fine structure size of the obtained glass product may be deviated from a wanted size, where at the end of molding with a high pressure a fine structure size of the mold for glass product and a fine structure size of the glass product formed by transfer of the fine structure of the mold are the same as one another but become different from one another when the glass product is cooled down to the room temperature. This is, ordinarily, because the fine structure of the mold is so designed that the size of the fine structure of the mold at the room temperature forms the wanted side. With this invention, in the light of size differences occurring due to above reasons, a mold having a fine structure of a size adjusted so that the fine structure size of the glass product falls within a permissive size precision, is used. The permissive size precision is selected in accordance with the kinds and fine structures of the glass products.

The size difference occurs when a mean thermal expansion coefficient $\alpha g$ of the glass to be molded is substantially different from a mean thermal expansion coefficient $\alpha m$ of the mold. The size of the fine structure of the mold is adjusted in consideration of the mean thermal expansion coefficient $\alpha g$ of the glass to be molded and the mean thermal expansion coefficient $\alpha m$ of the mold.

Specifically, as a mold for forming at least a fine structure, a mold is used having a mean thermal expansion coefficient $\alpha m$ larger than a mean thermal expansion coefficient $\alpha g$ of the glass to be molded and a size Sm of the fine structure of the mold at the room temperature smaller than a size Sg of the glass' fine structure at the room temperature in order that the fine structure size of the glass product falls within the permissive size precision. Alternatively, as a mold for forming at least a fine structure, a mold is used having a mean thermal expansion coefficient $\alpha m$ smaller than a mean thermal expansion coefficient $\alpha g$ of the glass to be molded and a size Sm of the fine structure of the mold at the room temperature larger than a size Sg of the glass' fine structure at the room temperature in order that the size of the fine structure of the glass product falls within the permissive size precision.

Moreover, when a mean thermal expansion coefficient $\alpha g$ of the glass to be molded is substantially not different from a mean thermal expansion coefficient $\alpha m$ of the mold, the size of the fine structure of the glass product is substantially the same as the fine structure of the mold made as in a wanted size. In this case, a mold is used in which a mean thermal expansion coefficient $\alpha m$ is substantially the same as a mean thermal expansion coefficient $\alpha g$ of the glass to be molded and in which a size Sm of the fine structure of the mold at the room temperature is substantially the same as a size Sg of the glass' fine structure at the room temperature.

The follow descriptions are more details of the above description. During an actual molding process for glass with pressure, the glass and a molding cavity have the same size to each other at a time when the glass is molded at a high temperature. During a cooling process after molding, the glass and the mold shrink respectively in a way along their respective thermal expansion curves. If the glass is pressed by the mold during cooling, the glass may be transformed in a manner that shrinkage of the mold meets with the size of the mold. As a result, thermal shrinkage of the glass contact surface with mold can assimilate to the thermal shrinkage curve of the mold. If the temperature goes down around the glass transition temperature Tg, however, the glass breaks the contacting state with the mold since the glass can be no longer substantially transformed, so that the glass shrinks in a fashion along the thermal expansion curve of the glass itself. It is to be noted that the glass cannot be transformed at the glass transition temperature or below, and therefore, the glass cannot substantially maintain the contact state with the mold.

Figure 2:
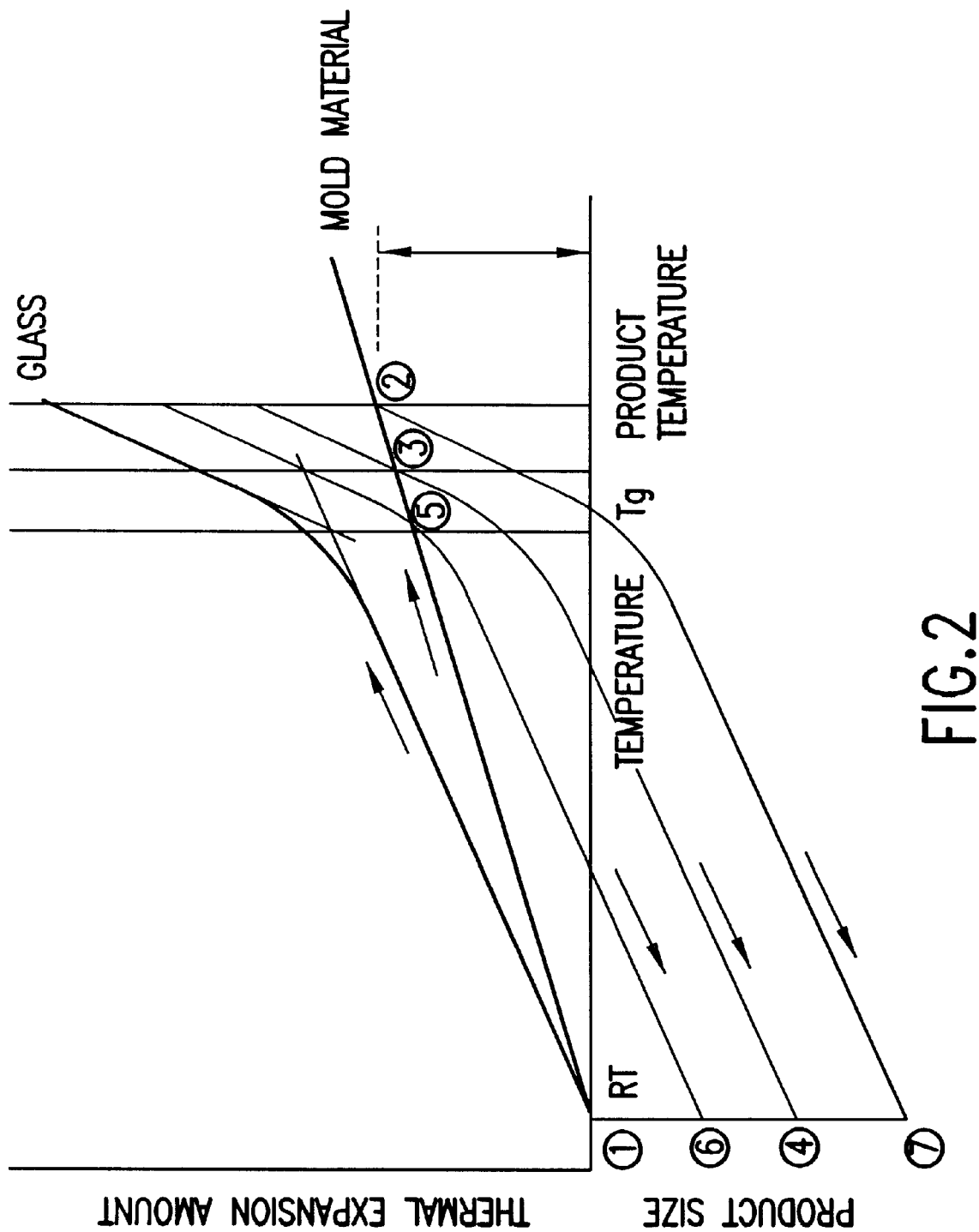
FIG. 2 is a diagram showing relationship between thermal expansion amounts of a mold material and glass and temperature.

Hereinafter, referring to FIG. 2 as a diagram, this theory will be specifically described with respect to relation between the molding process and the size of the product. In FIG. 2, the axis of ordinates indicates thermal expansion amount, and the axis of abscissas indicates temperature; FIG. 2 shows relation between thermal expansion amount and temperature of mold material and glass. An example shown in FIG. 2 illustrates a case that the mean thermal expansion coefficient of the mold material is smaller than the mean thermal expansion coefficient of the glass.

When the mold is heated up to the molding temperature, the mold expands by the thermal expansion portion $\Delta M$ of the mold as shown in FIG. 2 [(1)→(2)]. Because the glass is molded by the expanded mold, the molded product is larger by $\Delta M$ than the mold size at the room temperature (2). When the molded product is pressed with the mold during the cooling process, the molded product shrinks in being transformed in complying with the thermal expansion curve of the mold [(2)→(3)]. If the molded product breaks the contact state with the mold at a temperature between the molding temperature and the glass transition temperature Tg, the product shrinks from (3) to (4) in a fashion along the thermal expansion curve of glass. When the contact state between the mold and the molded product remains down to the glass transition temperature Tg, the product shrinks in a route of (2)→(5)→(6). On the other hand, when the product is cooled where almost not contacting with the mold, the product shrinks in a route of (2)→(7).

As described above, even when the same mold and glass is used, the apparent shrinkage amount of the glass during the cooling process may vary depending on what extent the mold and glass are in contact with each other, and the obtainable product size may vary. The apparent shrinkage amount of the glass during the cooling process can be reduced by contacting the glass with the mold until reaching a lower temperature. A distortion of the product during the cooling process can be prevented by contacting the glass with the mold until reaching a lower temperature range where the glass cannot be transformed. Therefore, contacting the mold with the glass until reaching a temperature as low as possible as well as rendering constant the temperature at which the contact state is broken between the mold and the glass, makes the product size stable and prevents distortion from occurring.

The temperature at which the contact state is broken between the mold and the glass, depends on a pressure condition exerted during the cooling process. That is, if no pressure is applied during the cooling process, the mold and glass begin to separate from one another around the molding temperature, thereby rendering the glass shrink largely as shown by a route of (2)→(7). On the other hand, a pressure of a certain amount or more is exerted during the cooling process, the mold and glass maintain the contact state until around the glass transition temperature Tg, reducing the apparent shrinkage amount of the glass on the contact surface.

It was turned out, as a result of research on the pressure during the cooling process, a pressure of at least 20 kg/cm² or more is effective to keep the contact state between the mold and the glass until reaching a further lower temperature. However, if a pressure of 400 kg/cm² or more is exerted, the product tends to suffer from molding burrs, and this would be unfavorable. Accordingly, a desirable range of pressure bringing substantially effective results is 20 to 400 kg/cm². To make the glass and the mold in contact with each other until the glass transition temperature Tg, it will be appropriate to apply a pressure of 80 kg/cm² or more. A further desirable range of pressure is, therefore, 80 to 400 kg/cm². A pressure can be uniformly exerted actually if implemented under a condition that the product is closely put in the cavity of the mold, thereby bringing a good effect of pressure. If a large pressure is given at a temperature of Tg or less at which the product become harder, the product tends to be broken by the pressure. Therefore, it is desirable to reduce the pressure stepwise or continuously from the molding temperature to a glass transition temperature Tg or below.

As described above, contacting the mold with the glass until reaching a temperature as low as possible and rendering constant the temperature at which the contact state is broken between the mold and the glass, makes the product size stable. However, an absolute size of the product cannot be made closer to a target size that was originally intended. As shown in FIG. 2, when the mean thermal expansion coefficient of the glass is larger than the mean thermal expansion coefficient of the mold, the product's size always becomes smaller than the room temperature size of the mold. On the other hand, when the mean thermal expansion coefficient of the glass is smaller than the mean thermal expansion coefficient of the mold, the product's size tends to be larger than the room temperature size of the mold. Hence, with this invention, a mold having a fine structure of a size so adjusted in advance that the fine structure size of the glass falls within a permissive size precision, is used as described above. The mold size can be corrected in a manner as follows, and such a size correction is preferred because making possible to obtain a glass product having the target size.

That is, it is preferred to use a mold having a size satisfying, as a size of a fine structure at a room temperature, a formula:

$$[1+(\alpha g-\alpha m)\times\Delta T+\alpha g'\times\Delta T']\times Sg$$

wherein Sg denotes a size of a fine structure of the glass product at the room temperature; αg denotes a mean thermal expansion coefficient of the glass to be molded in a temperature range from the room temperature to the glass transition temperature of the glass to be molded; αm denotes a mean thermal expansion coefficient of the mold in a temperature range from the room temperature to the glass transition temperature of the glass to be molded; ΔT denotes a difference between the room temperature and the glass transition temperature of the glass to be molded; ΔT' denotes a difference between a temperature at which the mold's pressure exerted to the glass product is released and the glass transition temperature, in a case where the mold's pressure exerted to the glass product is released at a temperature higher than the glass transition temperature after pressing the mold with a high pressure; and αg' is a thermal expansion coefficient of the glass to be molded at a mean temperature of summation of the glass sag temperature and the glass transition temperature.

With the above formula, a value of (αg−αm)×ΔT corrects size differences occurring, between the room temperature and the glass transition temperature of the glass to be molded, based on the differences between the mean thermal expansion coefficient αg of the glass to be molded and the mean thermal expansion coefficient αm of the mold. When the mold's pressure exerted to the glass product is released at a temperature higher than the glass transition temperature of the glass to be molded, glass shrinkage may occur based on the thermal expansion coefficient of the glass to be molded between the temperature that the mold's pressure exerted to the product is released and the glass transition temperature of the glass to be molded. This point can be corrected by a formula αg'×ΔT'.

To make the product size stable more, it is desirable, after molded with pressure, to release the mold's pressure exerted to the product at a glass transition temperature or below of the glass to be molded. In this situation, since ΔT'=0, it is appropriate to use a mold satisfying, as a size of the fine structure at the room temperature, a formula:

$$[1+(\alpha g-\alpha m)\times\Delta T]\times Sg$$

wherein Sg, αg, αm, and ΔT are the same as above.

Glass transition temperature of glass

Figure 3:
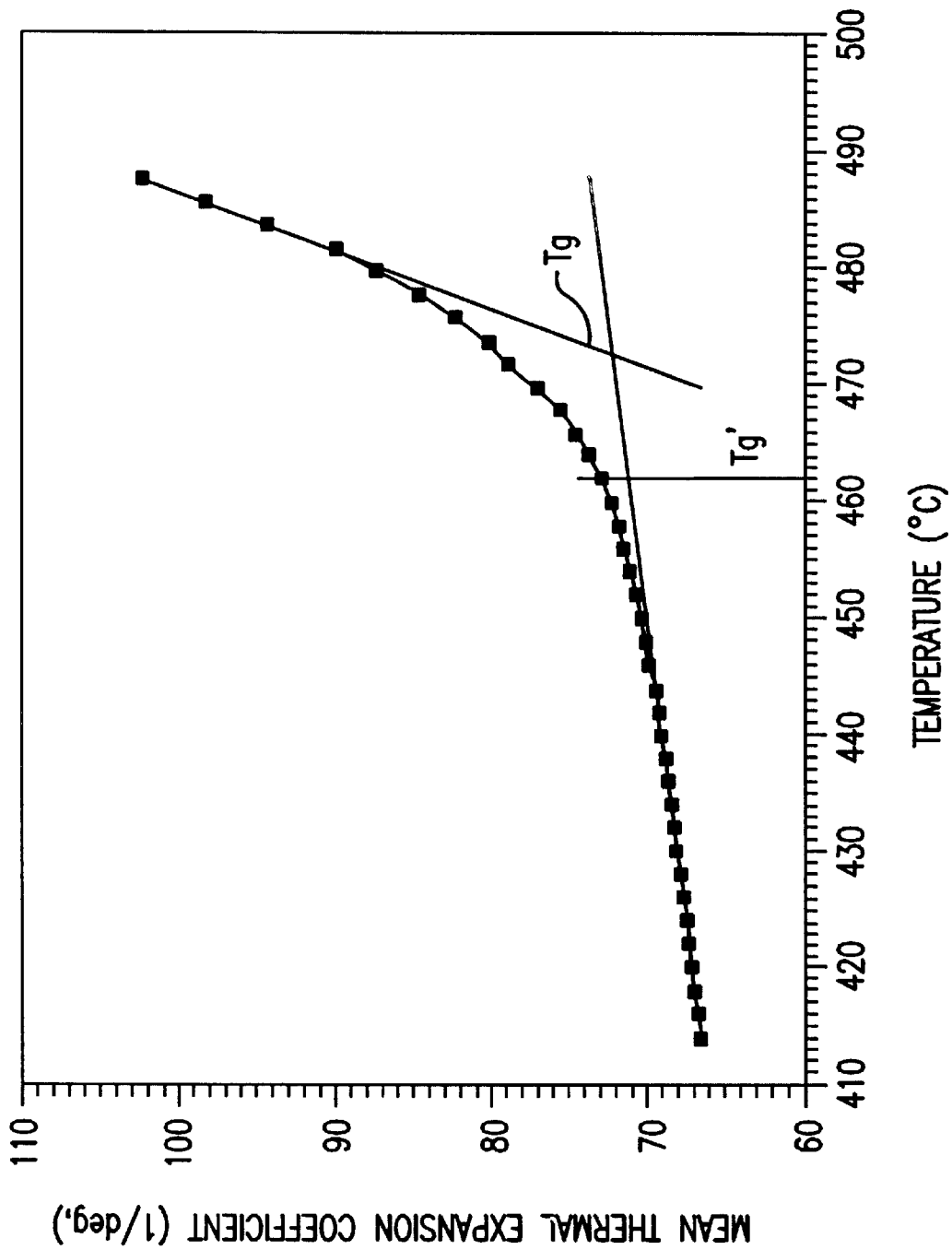
FIG. 3 is a measured result of thermal expansion coefficient around the glass transition temperature (Tg) of the glass.

FIG. 3 shows a measured result of thermal expansion coefficient around the glass transition temperature Tg of the glass used in an embodiment of the invention (mean thermal expansion coefficients of the room temperature through respective temperatures). As shown in FIG. 3, the thermal expansion coefficient of the glass increases rapidly as passing the glass transition temperature Tg though remaining small until the glass transition temperature Tg. Generally, the thermal expansion coefficient of the glass is frequently measured using a cylindrical bar of 20 millimeters in height and 5 millimeters in diameter with a quartz glass bar of the same size as a reference sample. The glass transition temperature Tg is generally sought from a temperature at which tangents, drawn at a portion where the expansion amount changes intensely, cross each other as shown in FIG. 3. As apparent from FIG. 3, however, the glass transition phenomenon occurs in a region and does not occur abruptly. In a strict sense, it is called as a glass transition region.

Meanwhile, a viscosity of the glass at the glass transition temperature Tg is $10^{13}$ to $10^{15}$ poises notwithstanding the kind of the glasses, and if the temperature is at the glass transition temperature or below, the glass in fact shows a glass state and has almost no fluidity under ordinary conditions. If the temperature is at the glass transition temperature Tg or above, the viscosity of the glass becomes low gradually, and the glass can be transformed substantially where the viscosity is $10^{11}$ poises or below. It is to be noted that the glass is molded in a viscosity range of $10^9$ to $10^4$ poises, which is a little lower than the viscosity above. As described above, the glass transition temperature Tg can be used as an indicator of a temperature at which the glass is solidified and no longer transformed. The glass transition phenomenon, though occurring in a region, is sought simply from a cross point drawn from the thermal expansion curve. The glass transition temperature therefore cannot be said as an exact temperature at which the glass loses its fluidity.

As in the invention, it is a critical point that to what extent the glass maintains the fluidity and as a result, the mold size can be reflected to the glass in maintaining the contact state with the mold, when the glass product is molded with a high size precision. Particularly, under a high pressure molding condition such as a molding in use of a mold, the glass may possibly be transformed even at a temperature lower than the glass transition temperature Tg, and maintaining the contact state with the mold even at such a temperature (lower than the glass transition temperature Tg) can improve the size precision. We have extensively researched temperature at which the glass can no longer be transformed under a high pressure condition for molding. As a result, we found that the temperature at which the glass can no longer be transformed under a high pressure condition for molding is, though may vary depending on strength of the pressure, a temperature 5 to 15 degrees Celsius lower than the glass transition temperature Tg which is sought by the high pressure molding. Accordingly, in this invention, it is desirable to set the glass transition temperature Tg' in the light of the pressure by subtracting 5 to 15 degrees Celsius from the glass transition temperature Tg sought by the thermal expansion measurement.

Therefore, with the invention, the mean thermal expansion coefficient $\alpha g$ is preferably given from a value in a temperature range of the room temperature to a temperature 5 to 15 degrees Celsius lower than the glass transition temperature of the glass to be molded. When the size of the fine structure of the mold is to be calculated, it is desirable to calculate the values of $\alpha g$, $\alpha m$, $\Delta T$, $\alpha g'$, and $\Delta T'$ where Tg' above is set as the glass transition temperature and then to calculate, using the obtained values, the formula $[1+(\alpha g-\alpha m)\times\Delta T+\Delta g'\times\Delta T']\times Sg$ or $[1+(\alpha g-\alpha m)\times\alpha T]\times Sg$.

According to the manufacturing method for molding the glass product according to the invention thus described, a product can be molded with heat and size precision of sub-micron or below, even if the product is an optical fiber holder having, as a fine structure, at least one of a single pitch or accumulated pitch for optical fiber engagement portions by which multiple optical fibers are fixed on an optical fiber holder.

Hereinafter, a correction method for size of the mold and a specific molding process are described in detail in exemplifying molding of optical fiber engagement portions for an optical fiber holder as an embodiment.

Example 1

A glass material containing 13.3 weight % $SiO_2$, 32.2 weight % $B_2O_3$, 44.5 weight % ZnO, 5.5 weight % $Al_2O_3$, and 4.5 weight % $LiO_2$, and 0.1 weight % $SnO_2$ as of externally mixed adding amount, was preliminarily formed with a high temperature to obtain a glass preform in a block shape having a width of 3.5 millimeters, a length of 10.5 millimeters, and a thickness of 2.05 millimeters with round corners. The vertical cross section of the glass preform indicated a rectangular except round corners, and the shape when viewed from the top side also indicated a rectangular except round corners. Accordingly, in the glass preform, a surface positioned perpendicular to a pressurizing direction at a time of molding with pressure (face extending perpendicular to a direction of the thickness of the glass preform) showed a flat surface. It is to be noted that the glass transition temperature Tg sought from the thermal expansion curve of the glass material was 473 degrees Celsius and the sag temperature was 511 degrees Celsius. The glass temperature (Tg') at which the glass would not be transformed due to loss of glass' fluidity was 463 degrees Celsius. The mean thermal expansion coefficient from the room temperature to the glass transition temperature Tg' was $72\times10^{-7}$ $deg^{-1}$, and the permeability of 350 nanometers wavelength ultraviolet ray at a thickness of 2 millimeters was 90 percent or more.

i. Description of Mold

A mold material A having tungsten carbide as an essential component was used as a material for mold, having a mean thermal expansion coefficient from the room temperature to the glass transition temperature Tg' of the glass for mold of $53\times10^{-7}$ $deg^{-1}$, and a mold constituted of a upper mold 2, a lower mold 7, and a side mold 5 was obtained. As shown in FIG. 4, the upper mold 2 constituting the mold 1 included a first molding portion 3 for forming optical fiber engagement portions for eight optical fibers placed parallel in a row made of V-shaped grooves, and a second molding portion 4 for forming, at an optical fiber guide block, a seat portion having the same width as the optical fiber guide block.

The first molding portion 3 was in a shape of a rectangular prism. Eight projections 3a each having a vertical cross section in an isosceles triangle shape in a transverse direction and a vertical cross section in a rectangular shape in a longitudinal direction, a length of 5 millimeters, a height of 170 millimeters, and a base width of 250 micron meters were formed at a lower end of the first molding portion 3 with a pitch of 250.2 micron meters in parallel in a row in corresponding to the optical fiber engagement portions to be formed. The target pitch of the product was 250 micron meters, so that the size correction amount in the mold was ±0.2 micron meter per pitch. Therefore, the size correction amount for eight pitches in total was ±1.4 micron meters. A brim 3b to be engaged with a top face, when viewed during use, of the side mold 5 was formed except on a side contacting the second molding portion 4.

The second molding portion 4 also has a rectangular prism. The lower face of the second molding portion 4 was a flat face and projected downward (lower direction when viewed during use) by 250 micron meters from the lower surface, when viewed during use, of the first molding portion 3 (a flat face except the eight projections 3a). Accordingly, there was a stepwise gap on the border between the first molding portion 3 and the second molding portion 4. A brim 4a to be engaged with a top face, when viewed during use, of the side mold 5 was formed on a top end, when viewed during use, of the second molding portion 4 except on a side contacting the first molding portion 3.

Those first and second molding portions 3, 4 were separate members and made into a united body in a mechanical way by means of a fixing frame 6. The fixing frame 6 was fixed to each member by screws, not shown, made of the same material as the upper mold. The clearance between the first and second molding portions 3, 4 was 4 micron meters.

The side mold 5 was for forming side faces of the optical fiber guide block as a target by inner side faces of the side mold 5 and was a cylindrical body having a horizontal cross section in a rectangular frame shape. The side mold 5 had, at an inner side of the top end, engagement portions 5a engaging with the fixing frame 6. The inner size when the side mold 5 was viewed from the top was 5×12 millimeters. The upper mold 2 enters from the top, when viewed during use, of the side mold 5 down to a prescribed depth, or namely, until the top face of the side mold 5 was stopped by the brims 3b, 4a of the upper mold 2. The brims 3b, 4a of the upper mold 2 function as stoppers when the glass was molded with pressure.

The lower mold 7 has a rectangular prism molding portion 7a for forming a bottom face of the target optical guide fiber block. The top face, when viewed during use, of the molding portion 7a was a flat face. A brim 7b for stopping the lower face, when viewed during use, of the side mold 5 was formed at a lower end, when viewed during use, of the molding portion 7a. When the glass was molded with pressure, the lower mold 7 was immobilized, and the side mold 5 was disposed on the lower mold 7 so that the brim 7b stops the lower face of the side mold 5. As a result, the top face of the molding portion 7a was positioned in an inner space of the side mold 5. The glass preform 8 was placed on the top face of the molding portion 7a.

A platinum alloy mold-releasing film 9 having a thickness of 500 angstroms was formed by a sputtering method on the lower face of the first molding portion 3 and a side face extending from the lower face to the lower face of the brim 3b, on the lower face of the second molding portion 4 and a side face extending from the lower face to the lower face of the brim 4a, on the inner side faces of the side mold 5 (including the surface of the engagement portions 5a), and on the top face of the molding portion 7a and a side face extending from the top face to the brim 7b, respectively. The size precision of the eight projections 3a having mold-releasing film 9 on the surface (precision in size with respect to the pitch and height) was within ±0.3 micron meter, and the flatness degrees of portions except the eight projections 3a in the lower face of the first molding portion 3. the lower face of the second molding portion 4, the inner side faces of the side mold 5, and the top face of the molding portion 7a were, in any case, within 1.0 micron meter.

The mold 1 constituted of the upper mold 2, the side mold 5, and the lower mold 7 having the mold-releasing film 9 was fabricated so that clearances between the upper mold 2 and the side mold 5 and between the side mold 5 and the lower mold 7 were 6 micron meters, respectively, so that a distance between the lower face (a flat face except the eight projections 3a) of the first molding portion 3 and the upper face of the molding portion 7a among distances between the upper and lower molds 2, 7 when the glass was molded with pressure was 1.5 millimeter, and so that a distance between the lower face of the second molding portion 4 and the top face of the molding portion 7a was 1.25 millimeter.

ii. Molding Method

The target optical fiber guide block was obtained by a molding with pressure in use of the mold 1 and the glass preform 8 as described above.

Figure 4A:
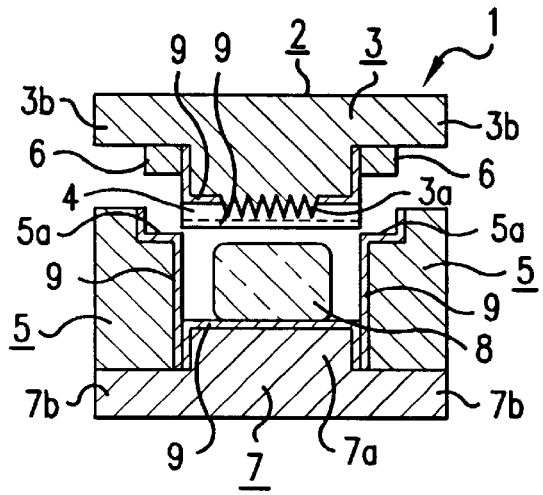
FIGS. 4(a) to 4(d) are cross sections showing a mold and a glass product used in a preferred embodiment of the invention and showing a manufacturing method used in the embodiment.
Figure 4C:
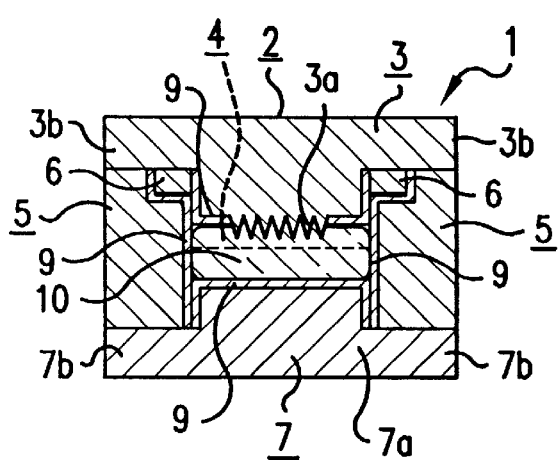
Figure 4B:
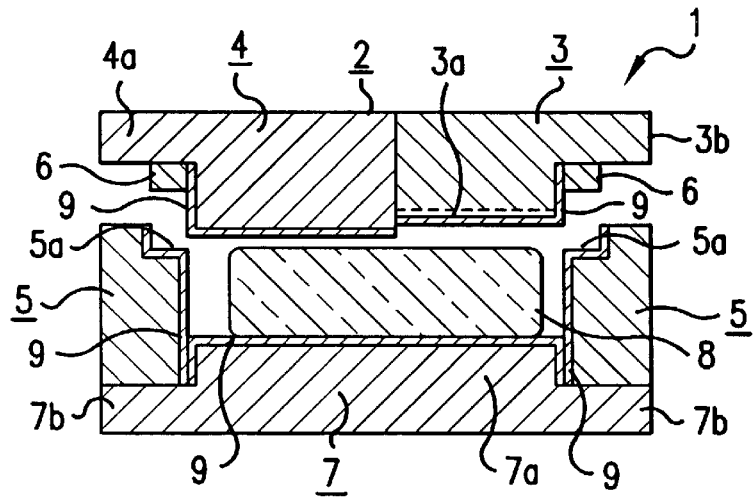

First, after the lower mold 7 and the side mold 5 were engaged so that the brim 7b of the lower mold 7 stopped at the lower face of the side mold 5, the glass preform 8 was placed in the inner side faces of the side mold 5 on the top face of the molding portion 7a of the lower mold 7 as to form a space in a substantially uniform manner. The upper mold 3 was held over the side mold 5. FIG. 4(a) shows vertical cross sections in the transverse direction of the mold 1 and the glass preform at that time; FIG. 4(b) shows vertical cross sections in the longitudinal direction of the mold 1 and the glass preform at that time.

Figure 4D:
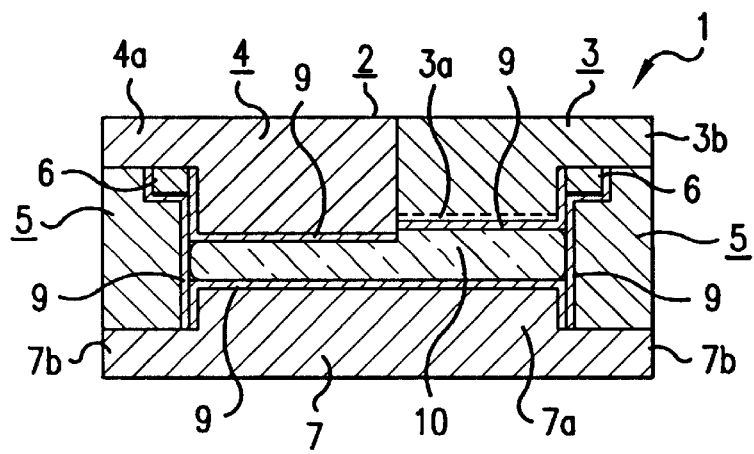

Then, the glass preform 8 disposed on the top face of the lower mold 7 thus described, as the preform 8 was in the mold 1, was heated in a nitrogen atmosphere so that the glass preform 8 was subject to temperature of 560 degrees Celsius (at that time, the viscosity of the glass was $10^8$ poises). Under this circumstance, the upper mold 2 was inserted in the side mold 5 with a molding pressure of 250 kgf/cm$^2$ until the brims 3b, 4a of the upper mold 2 stop at the top face of the side mold 5, and the preform 8 was then pressed for 120 seconds. FIG. 4(c) shows vertical cross sections in the transverse direction of the mold 1 and the product 10 at that time; FIG. 4(d) shows vertical cross sections in the longitudinal direction of the mold 1 and the product 10 at that time.

Figure 5:
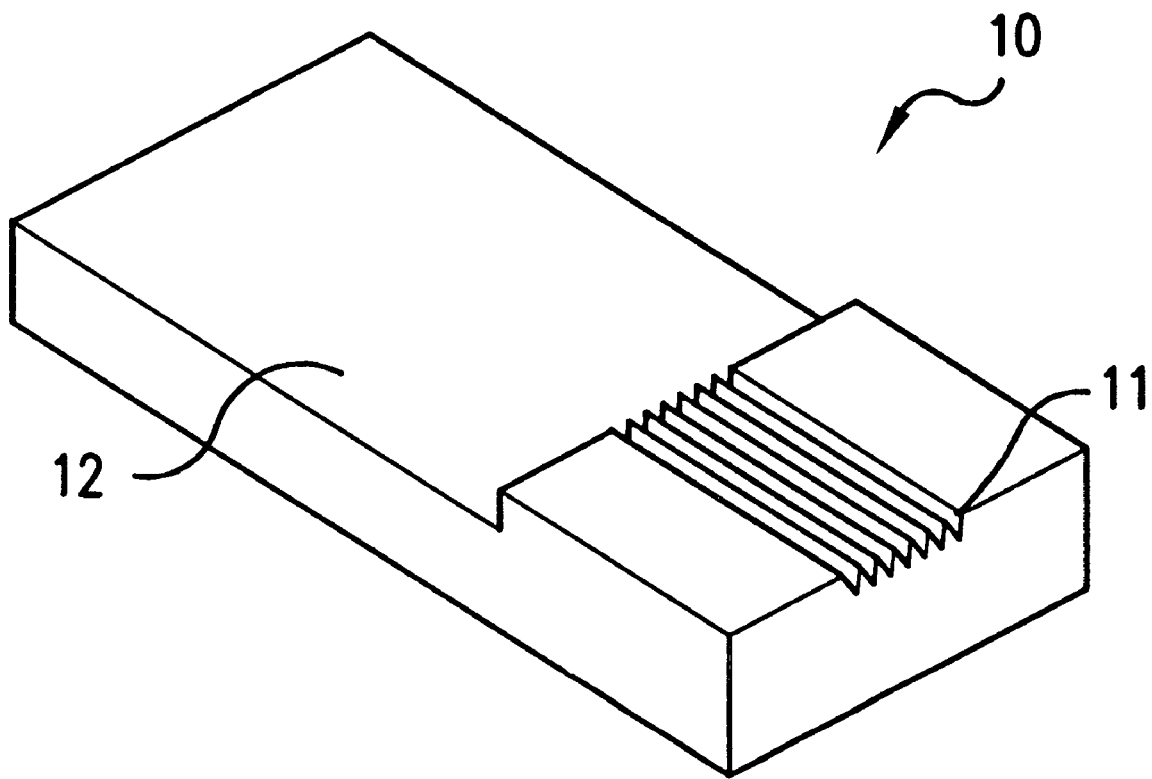
FIG. 5 is a perspective view showing an optical fiber guide block as a glass product.

The pressure was subsequently reduced to 100 kgf/cm$^2$, and then application of he pressure was stopped after the mold was cooled down to a temperature 30 degrees Celsius lower than the glass transition temperature Tg while the pressure was gradually reduced. Then, the product 10 was released from the mold 1 upon cooled to the room temperature. The obtained product was an optical fiber guide block (hereinafter "optical fiber guide block 10") having on one face of the block, as shown in FIG. 5, optical fiber engagement portions 11 for eight optical fiber made from V-shaped grooves each arranged in parallel having a length of 5 millimeters, a depth of 170 micron meters, and atop end width of 250 micron meters, and a seat portion 12 formed at a lower position than the top face of the optical fiber engagement portions 11. The optical fiber guide block 10 had a width of 5 millimeters, a length of 12 millimeters, and a maximum thickness of 1.5 millimeter; the width of the seat portion 12 was the same as the width of the optical fiber guide block 10. The corners corresponding to the clearances between the upper mold 2 and the side mold 5, between the lower mold 5 and the side mold 5, and between the first and second molding portions 3, 4 of the upper mold 2, among corers of the optical fiber guide block 10 were made of free surfaces, and the shape of the optical fiber guide block 10 was rectangular when viewed from the top.

iii. Measurement and Evaluation of precision

The precision in size of the optical fiber engagement portion 11 formed on the optical fiber guide block 10 was measured in the following manner.

Figure 6:
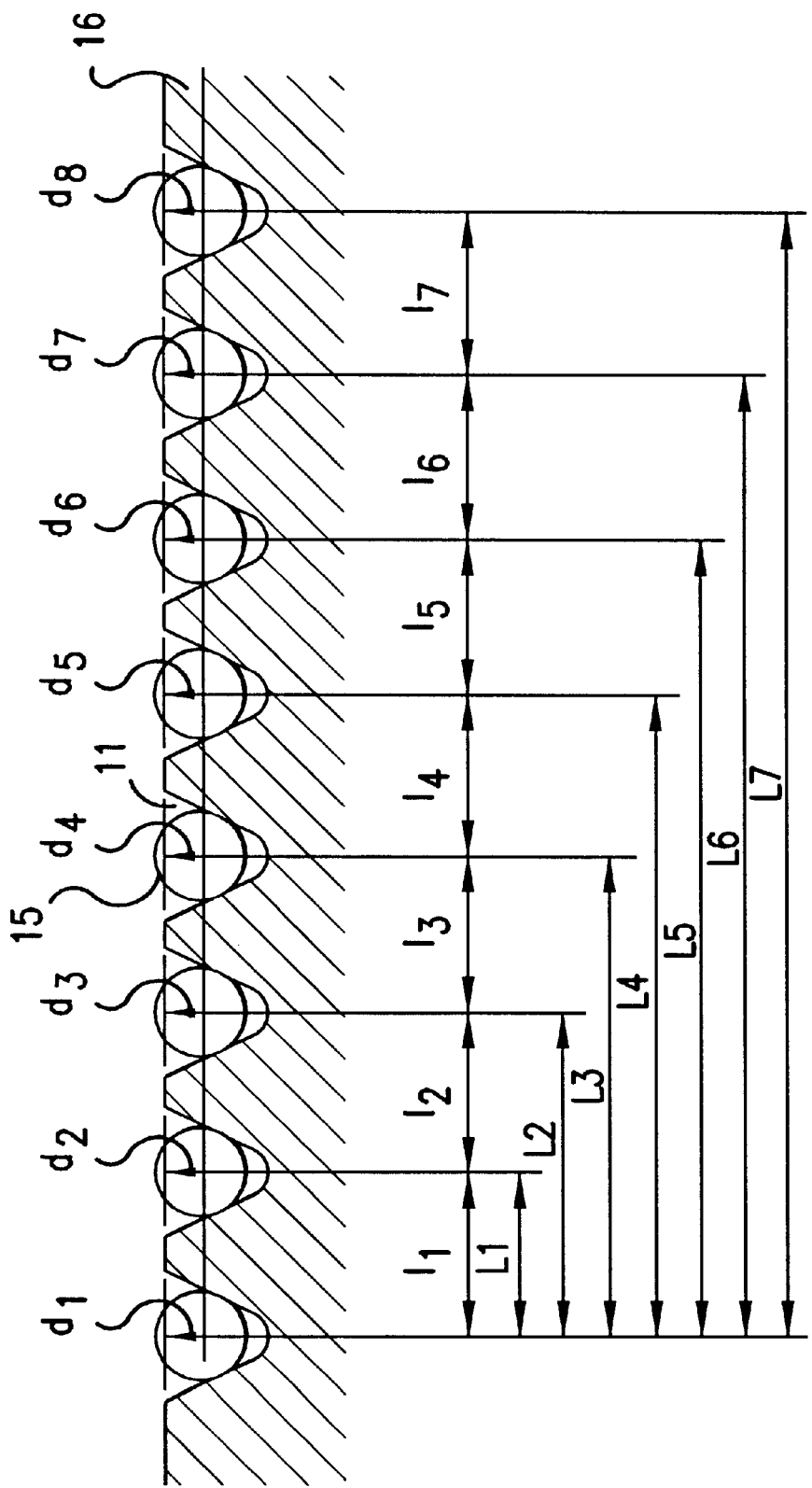
FIG. 6 is an enlarged illustration showing an optical fiber engagement portion of a typical optical fiber array.

First, a contour measurement apparatus (Contour Record 2600 C (trade name) made by Tokyo Seimitsu Corp.) of exploring needle type having a needle of a micron-meter curvature tip was used. The needle of the contour measurement apparatus was scanned in a direction perpendicular to the longitudinal direction of the optical fiber engagement portions 11 to pick up contour coordinates of the respective optical fiber engagement portions 11 and their vicinity, and the obtained contour was displayed on a monitor. As shown in FIG. 6, circles 15 having a diameter of 125 micron meters corresponding to an outer diameter of quartz type single mode optical fiber were inserted virtually one by one in the respective optical fiber engagement portions 11 on the monitor, and center coordinates of the respective circles 15 when the circles 15 contact the two slopes of each optical fiber engagement portion were sought.

Based on the center coordinates of the respective circles 15, sought were distances (single pitch) $l_1$ to $l_7$ between two circles 15 adjacent to each other and precision in size thereof (single pitch precision), distances (accumulated pitch) from a center of the circle 15 virtually inserted in the optical fiber engagement portion 11 located leftmost side in the transverse direction of the optical fiber guide block 10 to a center of a circle 15 and precision in size thereof (accumulated pitch precision), and vertical distances $d_1$ to $d_8$ between the center of each circle 15 and a plane including a top face 16 of an edge on a right side in the transverse direction of the optical fiber engagement portions 11 and precision in size thereof (depth precision).

Similarly, with respect to the eight projections 3a formed at the first molding portion 3 of the upper mold 2 for forming the optical fiber engagement portions 11, sought were single pitches $l_1$ to $l_7$ and precision in size thereof, accumulated pitches $L_1$ to $L_7$ and precision in size thereof, and heights (depths) corresponding to the vertical distances $d_1$ to $d_8$ and precision in size thereof. It is to be noted that with respect to any of the optical fiber engagement portions 11 and the projection 3a formed at the first molding portion 3, the designed value of the single pitch $l_1$ to $l_7$ was 250 micron meters, and the designed value of the depth (or height for the projection 3a) $d_1$ to $d_8$ was 52.8 micron meters.

Any of the single pitch precision, the accumulated pitch precision, and the depth precision of the optical fiber guide block 10 was ±0.3 micron meter, which suggests that the size precision of the obtained optical fiber guide block 10 was high. We have confirmed that molding was implemented under a high transfer precision because any of the size precision of the single pitch $l_1$ to $l_7$, the size precision of the accumulated pitch $L_1$ to $L_7$, and the size precision of the heights $d_1$ to $d_8$ with respect to the eight projections 3a formed at the first molding portion 3 of the upper mold 2 was within ±0.3 micron meter.

The optical fiber guide block 10 having the size precision thus described was suitable for a component of an optical fiber array for optically connecting, with ±1.0-micron meter alignment precision, tape fibers (thickness was about 400 micron meters) in which eight quarts type single mode optical fibers each having an outer diameter of 125 micron meter were arranged parallel in a row with a pitch of 250 micron meters.

iv. Continuous Molding Operation

Molding with the pressure under the same condition was repeated 500 times or more using the same mold as described above.

As a result, the mold did not raise any problem. Any of the optical fiber guide blocks formed during this continuous operation had no molding burr or no impaired precision in size or shape.

Example 2

Except that the upper mold material of the mold was solely replaced with ultra hard material B having tungsten carbide as an essential component (having a mean thermal expansion coefficient from the room temperature to the glass transition temperature Tg' of $47 \times 10^{-7}$ deg$^{-1}$) and that each pitch of the eight projections corresponding to the shape of the optical fiber engagement portions was changed to 250.3 micron meters, the optical fiber guide block 10 was molded under exactly the same method as that used for Example 1.

The single pitch precision, the accumulated pitch precision, and the depth precision regarding the optical fiber guide block 10 were within ±0.5 micron meter, respectively, which suggests that the obtained optical fiber guide block 10 was made with high precision. We have confirmed that molding was implemented under a high transfer precision because any of the size precision of the single pitch $l_1$ to $l_7$, the size precision of the accumulated pitch $L_1$ to $L_7$, and the size precision of the heights $d_1$ to $d_8$ with respect to the eight projections 3a formed at the first molding portion 3 of the upper mold 2 was within ±0.5 micron meter.

Example 3

Except that the upper mold material of the mold was solely replaced with crystallized glass material C (having a mean thermal expansion coefficient from the room temperature to the glass transition temperature Tg' of $72 \times 10^{-7}$ deg$^{-1}$) and that each pitch of the eight projections corresponding to the shape of the optical fiber engagement portions was changed to 250 micron meters (no size correction), the optical fiber guide block 10 was molded under exactly the same method as that used for Example 1. It is to be noted that the crystallized glass material C had the completely the same mean thermal expansion coefficient as the glass for molding in a temperature range from the room temperature to the glass transition temperature Tg'.

The single pitch precision, the accumulated pitch precision, and the depth precision regarding the optical fiber guide block 10 were within ±0.3 micron meter, respectively, which suggests that the obtained optical fiber guide block 10 was made with high precision. We have confirmed that molding was implemented under a high transfer precision because any of the size precision of the single pitch $l_1$ to $l_7$, the size precision of the accumulated pitch $L_1$ to $L_7$, and the size precision of the heights $d_1$ to $d_8$ with respect to the eight projections 3a formed at the first molding portion 3 of the upper mold 2 was within ±0.3 micron meter.

Example 4

Except that the upper mold material of the mold was solely replaced with cermet material D having titanium carbide and titanium nitride as essential components (having a mean thermal expansion coefficient from the room temperature to the glass transition temperature Tg' of $78 \times 10^{-7}$ deg$^{-1}$) and that each pitch of the eight projections corresponding to the shape of the optical fiber engagement portions was changed to 249.9 micron meters, the optical fiber guide block 10 was molded under exactly the same method as that used for Example 1. It is to be noted that a carbonic mold-releasing film, in instead of the platinum alloy mold-releasing film, was formed with a thickness of 500 angstroms on the surfaces of the cermet material D by an ion plating method.

The single pitch precision, the accumulated pitch precision, and the depth precision regarding the optical fiber guide block 10 were within ±0.3 micron meter, respectively, which suggests that the obtained optical fiber guide block 10 was made with high precision. We have confirmed that molding was implemented under a high transfer precision because any of the size precision of the single pitch $l_1$ to $l_7$, the size precision of the accumulated pitch $L_1$ to $L_7$, and the size precision of the heights $d_1$ to $d_8$ with respect to the eight projections 3a formed at the first molding portion 3 of the upper mold 2 was within ±0.3 micron meter.

Comparative Example 1

Except that the pitch of the eight projections corresponding to the shape of the optical fiber engagement portions was changed to 250.0 micron meters, the optical fiber guide block 10 was molded under exactly the same method as that used for Example 1.

Regarding the optical fiber guide block 10, the single pitch precision showed −0.2 to −0.6 micron meter smaller than the target 250.0 micron meters, and the accumulated pitch precision $L_7$ showed −1.4 to −1.6 micron meter smaller than the target 1750 micron meters. To the contrary, the depth precision was within ±0.3 micron meter, and we could confirm the obtained optical fiber guide block 10 had little distortion. As described above, the obtained optical fiber guide block 10, though having little distortion, could not be used as a component for an optical fiber array for optically connecting, with alignment precision of +1 micron meter, tape fibers (having a thickness of about 400 micron meters) in which eight quartz single mode optical fibers are arranged parallel in a row with a pitch of 250 micron meters, because the accumulated pitch was 1.4 micron meters or more smaller.

Comparative Example 2

Except that the pitch of the eight projections corresponding to the shape of the optical fiber engagement portions was changed to 250.0 micron meters (no size correction) and that no pressure was applied during cooling process after molding, the optical fiber guide block 10 was molded under exactly the same method as that used for Example 1.

Regarding the optical fiber guide block 10, the single pitch precision showed 0.6 to 1.2 micron meter smaller than the target 250.0 micron meters, and the accumulated pitch precision $L_7$ showed 5.4 to 7.6 micron meter smaller than the target 1750 micron meters. Moreover, the depth precision was within ±2.8 micron meters, and we could confirm the obtained optical fiber guide block 10 had distortion. As described above, the obtained optical fiber guide block 10 had distortion, and could not be used as a component for an optical fiber array for optically connecting, with alignment precision of ±1 micron meter, tape fibers (having a thickness of about 400 micron meters) in which eight quartz single mode optical fibers are arranged parallel in a row with a pitch of 250 micron meters, because the accumulated pitch was 5.4 micron meters or more smaller.

Figure 7:
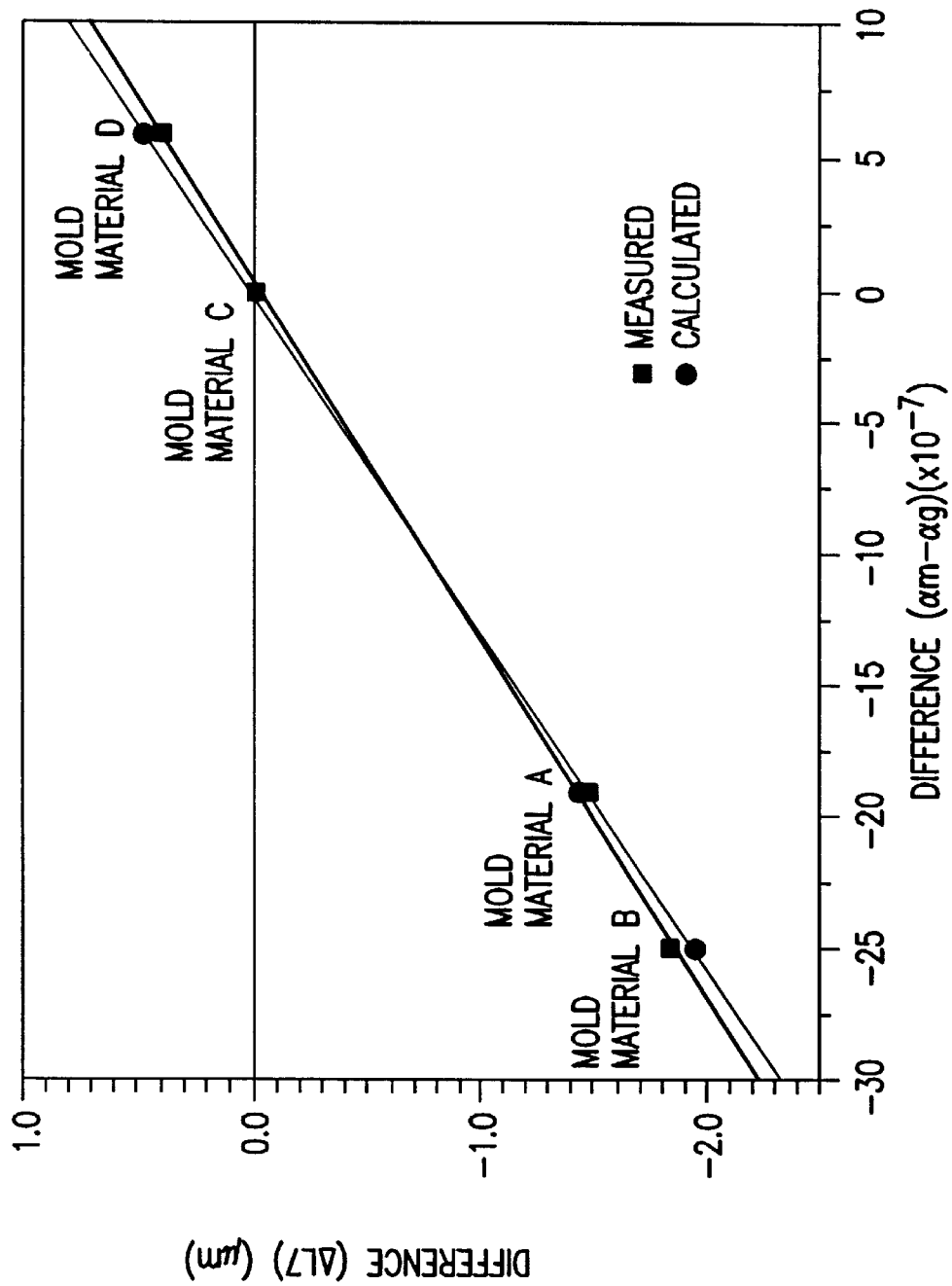
FIG. 7 is a diagram showing relationship between mean thermal expansion differences (αm−αg) between respective mold materials, as first to fourth embodiments as well as a first comparative example, and the glass to be molded and differences ($\Delta L_7$) between the mold and accumulated pitch $L_7$ of optical fiber engagement portions, regarding the mold and the optical fiber guide block.

FIG. 7 is made by plotting, on the axis of the abscissa, differences ($\alpha m - \alpha g$) of the mean thermal expansion coefficients between respective materials of Examples 1 to 4 and Comparative Example 1 and the glass to be molded, in a temperature range from the room temperature to the glass transition temperature Tg' for glass to be molded and, on the axis of ordinates, differences ($\Delta L_7$) of the accumulated pitch of the optical fiber engagement portions with respect to the mold and product for the optical fiber guide block. In FIG. 7, calculated values of ($\alpha m - \alpha g$)×$L_7$×(Tg' of the glass to be molded–the room temperature) are also plotted for the purpose of comparisons. In these calculations, $\alpha g$ was $72 \times 10^{-7}$ deg$^{-1}$; $L_7$ was 1750 micron meters; Tg' for the glass to be molded was 463 degrees Celsius; the room temperature was 20 degrees Celsius. We used that $\alpha m$ was values set forth in Examples and Comparative Examples.

As shown in FIG. 7, the differences of the accumulated pitch $L_7$ of the optical fiber engagement portions of the mold and product well match to the calculated values of ($\alpha m - \alpha g$)×$L_7$×(Tg' of the glass to be molded–the room temperature). That is, a product having the target size can be obtained by calculating the differences $\Delta L_7$ of the accumulated pitch $L_7$ as ($\alpha m - \alpha g$)×$L_7$×(Tg' of the glass to be molded–the room temperature) and correcting the pitch of the mold in advance. The above correction values are, notably, size correction values where the glass and the mold are made in contact with each other until reaching the temperature of Tg'. That is, the size precision of the product becomes most stable because it is a molding process that the apparent shrinkage amount of the glass molded surface during the cooling process is minimized.

On the other hand, the contact state of the mold and the glass may be lost at a temperature higher than the glass transition temperature Tg' if the pressure is suppressed during the cooling process or if a filling amount of the glass filled into the cavity of the mold is suppressed, and as a result, the apparent shrinkage amount of the glass increases, thereby making smaller the product size. Accordingly, even if a mold more or less larger than the mold size corrected by the correction formula above is used, a product having the target size can be obtained according to the molding conditions. If the pressure or filling amount is suppressed too much, however, such suppression makes the stability of molding precision worse. According to our extensive research, it was turned out that the size adjustment amount that the molding precision will not be impaired has a limitation of 0.2 percent with respect to the target size value. In other words, the mold size can be made 0.2 percent larger of the target size value with respect to the size-corrected mold size described above. Such a method is very effective when the pressure condition or the glass filling amount is suppressed to suppress molding burrs.

The corrected size of the mold can be changed more or less, if it is within a permissive range of size errors of the product. For example, in the optical fiber guide block of Example 1, the permissive range of the size error of the accumulated pitch $L_7$ is maximum 1.0 micron meter or less. Therefore, with respect to the corrected mold size, a size adjustment of ±1.0 micron meter, preferably ±0.5 micron meter is allowed.

As of Example 3, a product having the target size can be obtained without a size correction of the mold upon use of a mold material having the mean thermal expansion coefficient, in a temperature range of the room temperature to the glass transition temperature Tg' of the glass to be molded, substantially the same as that of the glass to be molded. The mean thermal expansion coefficients do not have to be exactly the same to each other and are enough if substantially the same. That is, there would be no problem, if the calculated value of ($\alpha m - \alpha g$)×$L_7$×(Tg' of the glass to be molded–the room temperature) falls within the permissive size precision of the product. For example, since in the optical fiber guide block of Example 1 the maximum permissive error is ±1 micron meter or less, the mean thermal expansion coefficient that makes the permissive error of $L_7$±1 micron meter or less, when calculated inversely, is ±12.8×10$^{-7}$. If size deviations for respective moldings are considered, the permissive error of $L_7$ is preferably ±0.5 micron meter or less, and in this case, the permissive difference of the mean thermal expansion coefficient is ±6.4×10$^{-7}$.

As described above the permissive value of the mean thermal expansion coefficient may vary depending on the target size and the maximum permissive error of the product and the glass transition temperature Tg' of the glass to be molded, and therefore, the mold material should be selected according to the object. To obtain a perfectly precise product, the mean thermal expansion coefficients of the glass and the mold should be exactly the same.

Example 5

The same mold as in Example 1 was used, and the size correction amount of the mold at the optical fiber engagement portions were changed to ±0.4 micron meter per pitch. The total size correction amount of pitches for eight fibers was set to ±2.8 micron meters. An optical fiber guide block 10 was molded under the following conditions in use of the above mold and the same glass preform as in Example 1.

The glass preform 8 disposed on the top face of the lower mold 7, as the preform 8 was in the mold 1, was heated in a nitrogen atmosphere so that the glass preform 8 was subject to temperature of 560 degrees Celsius (at that time, the viscosity of the glass was 10$^8$ poises). Under this circumstance, the upper mold 2 was inserted in the side mold 5 with a molding pressure of 120 kgf/cm$^2$ until the brims 3b, 4a of the upper mold 2 stop at the top face of the side mold 5, and the preform 8 was then pressed for 120 seconds. The pressure was subsequently reduced to 50 kgf/cm$^2$, and then application of the pressure was stopped when the mold was cooled down to a temperature of 483 degrees Celsius, which is higher than the glass transition temperature Tg', while the pressure was gradually reduced. Then, the product 10 was released from the mold 1 upon cooled to the room temperature.

Measurement and Evaluation of Precision

The single pitch precision, the accumulated pitch precision, and the depth precision regarding the optical fiber guide block 10 were within ±0.8 micron meter, respectively, which suggests that the obtained optical fiber guide block 10 was made with high precision. The obtained optical fiber guide block 10 having the size precision thus described is suitable as a component for an optical fiber array for optically connecting, with alignment precision of ±1 micron meter, tape fibers (having a thickness of about 400 micron meters) in which eight quartz single mode optical fibers each having an outer diameter of 125 micron meters are arranged parallel in a row with a pitch of 250 micron meters.

Description of Size Correction Amount of Molds

The glass transition temperature Tg' of the glass preform was 463 degrees Celsius, and the sag temperature sought from the thermal expansion curve is 510 degrees Celsius. The mean temperature of summation of both temperatures is 487 degrees Celsius. Since the temperature to stop the application of the pressure is 485 Celsius degrees, the difference ΔT' is 22 degrees Celsius. Since the mean thermal expansion coefficient αg' in a temperature range of Tg to 487 degrees Celsius is $390 \times 10^{-7}$ $deg^{-1}$, the value of αg'×ΔT'× 1750 becomes 1.5 micron meter. Since the correction amount (αg−αm)×ΔT×1750 is 1.47 micron meter, the total correction amount becomes 2.97 micron meters.

According to the invention, a method for molding glass products having a fine structure as of an optical fiber holder with a high size precision can be provided, and a method for molding, with a high temperature and a high size precision, glass products having a fine structure required of size precision in the order of sub-micron or below as of an optical fiber holder can be provided.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but the be defined claims set forth below.

What is claimed is:

1. A method for manufacturing a glass product comprising the steps of:

preparing a mold having a size satisfying, as a function of a size of a fine structure at a room temperature, a formula:

$$(1+(\alpha g-\alpha m) \times \Delta T) \times Sg$$

wherein Sg denotes a size of a fine structure of the glass product at the room temperature; αg denotes a mean thermal expansion coefficient of the glass to be molded in a temperature range from the room temperature to the glass transition temperature of the glass to be molded; αm denotes a mean thermal expansion coefficient of the mold in a temperature range from the room temperature to the glass transition temperature of the glass to be molded; ΔT denotes the difference between the room temperature and the glass transition temperature of the glass to be molded;

heating glass at sag temperature of the glass or above;

pressing the heated glass using the mold to form the glass product having the fine structure; and after the glass is molded with pressure, releasing the pressure exerted on the glass product by the mold at a temperature of the glass transition temperature or less.

2. The method according to claim 1, wherein values of αg, αm, ΔT, are calculated by replacing the glass transition temperature with a temperature Tg' which is 5 to 15 degrees Celsius lower than the glass transition temperature of the glass to be molded sought from a thermal expansion measurement and the size of the fine structure of the glass product is calculated from the obtained values.

3. The method according to claim 1, wherein releasing the pressure after the glass is molded with pressure is conducted step wise or continuously from the molding temperature to the glass transition temperature Tg or below.

4. The method according to claim 1, wherein releasing the pressure after the glass is molded with pressure is conducted at a pressure between 20–400 $kg/cm^2$.

5. A method for manufacturing a glass optical fiber holder comprising the steps of:

preparing a mold having a size satisfying, as a function of a size of a fine structure at a room temperature, a formula:

$$(1+(\alpha g-\alpha m) \times \Delta T) \times Sg$$

wherein Sg denotes a size of a fine structure of the optical fiber holder at the room temperature; αg denotes a mean thermal expansion coefficient of a glass to be molded in a temperature range from room temperature to a glass transition temperature of said glass to be molded; αm denotes a mean thermal expansion coefficient of said mold in a temperature range from room temperature to said glass transition temperature of said glass to be molded; ΔT denotes the difference between the room temperature and the glass transition temperature of the glass to be molded;

heating glass at sag temperature of said glass to be molded or above; and pressing the heated glass with a mold to form a glass optical fiber holder having fine structure which includes a single pitch or accumulated pitch for optical fiber engagement portions for securely holding multiple optical fibers on said optical fiber holder.

6. The method of claim 5 further comprising, after the glass is molded with pressure, releasing the pressure exerted to the glass product by the mold at a temperature of the glass transition temperature or less.

7. The method according to claim 6, wherein releasing the pressure after the glass is molded with pressure is conducted step wise or continuously from the molding temperature to the glass transition temperature Tg or below.

8. The method according to claim 6, wherein releasing the pressure after the glass is molded with pressure is conducted at a pressure between 20–400 $kg/cm^2$.

* * * * *